United States Patent
Roxbergh et al.

(10) Patent No.: US 8,781,531 B2
(45) Date of Patent: Jul. 15, 2014

(54) HANDLING CONTROL CHANNELS IN A WCDMA SYSTEM

(75) Inventors: Jan Roxbergh, Sollentuna (SE); Markus Ringström, Stockholm (SE); Patrik Karlsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/883,806

(22) PCT Filed: Nov. 8, 2010

(86) PCT No.: PCT/SE2010/051219
§ 371 (c)(1),
(2), (4) Date: May 7, 2013

(87) PCT Pub. No.: WO2012/064236
PCT Pub. Date: May 18, 2012

(65) Prior Publication Data
US 2013/0231159 A1    Sep. 5, 2013

(51) Int. Cl.
*H04B 1/38* (2006.01)
(52) U.S. Cl.
USPC ............ 455/561; 455/501; 455/570; 455/296
(58) Field of Classification Search
CPC .................. H04B 1/71072; H04B 2001/7107; H04B 2001/7152
USPC ................... 455/501, 63.1, 68, 561, 570, 296
See application file for complete search history.

(56) References Cited

U.S. PATENT DOCUMENTS

| | | |
|---|---|---|
| 2003/0162573 A1 | 8/2003 | Horng et al. |
| 2006/0120436 A1* | 6/2006 | Komatsu ....................... 375/144 |
| 2010/0142479 A1 | 6/2010 | Black et al. |
| 2010/0190447 A1* | 7/2010 | Agrawal et al. .............. 455/63.1 |
| 2010/0227637 A1* | 9/2010 | Kwon et al. .................. 455/522 |

FOREIGN PATENT DOCUMENTS

WO    WO 2008/036280    3/2008

OTHER PUBLICATIONS

3GPP TS 25.211 V5.20, $3^{rd}$ Generation Partnership Project; Technical Specification Group Radio Access Network; Physical Channels and Mapping of Transport Channels onto Physical Channels (FDD) (Release 5) (Sep. 2002).
3GPP TS 25.212 V5.0.0, $3^{rd}$ Generation Partnership Project; Technical Specification Group Radio Access Network; Multiplexing and Channel Coding (FDD) (Release 5) (Mar. 2002).
25.213 Section 4.2.0; $3^{rd}$ Generation Partnership Project; Technical Specification Group Radio Access Network; Spreading and Modulation (FEE) (Release 4) (Dec. 2001).
International Search Report for PCT/SE2010/051219, dated Jul. 18, 2011.
Written Opinion for PCT/SE2010/051219, dated Jul. 18, 2011.

* cited by examiner

*Primary Examiner* — Tuan Pham
(74) *Attorney, Agent, or Firm* — Nixon & Vanderhye, P.C.

(57) ABSTRACT

A radio base station for use in a Wideband Code Division Multiple Access network. The radio base station comprises a receiver for receiving radio signals transmitted over the air by users, and a first processor for processing the received signals in order to recover signals for a first group of users, the "cancellers", and a first set of control signals for a second group of users, the "cancellees". The radio base station further comprises an interference canceller for performing interference cancellation on the received signals using the recovered signals in order to generate an interference cancelled signal, a second processor for subsequently processing the interference cancelled signal in order to recover a second set of control signals for the cancellees, and a controller for using the control signals to control the transmission of data towards said cancellees.

12 Claims, 3 Drawing Sheets

HANDLING CONTROL CHANNELS IN A WCDMA SYSTEM

This application is the U.S. national phase of International Application No. PCT/SE2010/051219 filed 8 Nov. 2010 which designated the U.S., the entire content of which is hereby incorporated by reference.

TECHNICAL FIELD

The present invention relates to a method and apparatus for handling control channels in a WCDMA system. More particularly, the invention relates to such a method and apparatus that facilitates the use of interference cancellation at radio base stations of WCDMA systems.

BACKGROUND

Many currently deployed cellular telephone networks rely upon Wideband Code Division Multiple Access (WCDMA) technology to transmit information over the air interface. These include Universal Mobile Telecommunications Systems (UMTS) based 3G networks. Whilst it is anticipated that at some point in the future WCDMA networks will be replaced with so-called 4G networks, there is an ongoing process to improve the performance of deployed networks until such time as 4G networks are introduced. FIG. 1 illustrates a number of components of a WCDMA network including, on the network side, a Radio Base Station (RBS) 1 and a Radio Network Controller (RNC) 2, as well as a user terminal or User Equipment (UE) 3.

One improvement that is being considered is the use of a technique known as Interference Cancellation (IC). IC might be used in order to achieve better performance in terms of, for example, peak data rates, system throughput and system capacity. IC is applied in the uplink direction from the UE to the RBS (and also potentially in the downlink direction). As such, the main impact of IC is felt at the RBS acting as receiver of the uplink channels. In the uplink direction, IC relies upon the fact that data transmitted by certain users (the "cancellers") is more "visible" within a received interference signal than data transmitted by other users (the "cancellees"). The basic steps in an IC process (at the RBS) are as follows:
1. detecting data in the signals sent by the cancellers,
2. regenerating an interference signal at the receiver using the detected data,
3. cancelling the regenerated interference signal from the received signal, and
4. detecting the signals of the remaining users, i.e. the cancellees.

This process is illustrated schematically in FIG. 2. The first step can be done before decoding (pre-decoding IC) or after decoding (post-decoding IC), where decoding is the process of removing the extra coding applied at the sender (often called channel coding). Channel coding involves adding extra bits to protect the information bits from errors, i.e. these extra bits can be used to correct the information bits if they have been corrupted during the radio transmission. The second step in the process involves mimicking how the transmitted bits arrive at the receiver. This involves going through the operations performed at the transmitter (what the transmitter has done to the data bits) and channel filtering (what the channel has done to the data bits).

The IC approach described above introduces significant delays in the layer 1 control loops, e.g. fast power control and HS-signalling. The detection and regeneration of the interference signal causes significant delays before the cancellees are treated. Among other control loops, the High Speed Downlink Packet Access (HSDPA) signalling on High Speed-Dedicated Physical Control Channel (HS-DPCCH) in the uplink, i.e. the HARQ ACK/NACK and the CQI signalling for the cancellee, will be adversely affected by this delay.

If the HS-DPCCH channels for the cancellees are detected after IC has been performed, then the increased delay for handling the ACK/NACK messages for the cancellees will cause extra HARQ processes to be used in the downlink. The number of processes running concurrently determines the number of "packets" that can be in-flight at any given time. As there are a limited number of such processes, and there might not be more processes available, a delay in handling the ACK/NACK messages for the cancellees at the RBS will cause the downlink data flow to wait until an in-use HARQ process is freed. The result of the extra delay will be a lower data throughput in the downlink. Furthermore, if the available memory allocated for the soft buffer (the soft buffer is an area of memory used to store data from erroneous data frames and which can be used to process subsequently received frames)—the size of which is standardized in 3GPP—is allocated to an increased number of HARQ processes, the largest transport blocks may no longer be supported and the performance of the largest supported transport blocks will decrease. Simulations indicate a performance loss exceeding 3 dB. As a consequence, both the supported theoretical maximum data rate and the achieved data rate in a realistic scenario would be impacted negatively.

If on the other hand the HS-DPCCH channels for the cancellees are detected prior to IC (thus avoiding the extra delays), the lower signal quality will require an increase of the HS-DPCCH transmitted power from the respective UEs, causing extra cell load and lower uplink cell capacity. If the HS-DPCCH channel transmitted power is not increased, then the lower signal quality will result in reduced capacity in the downlink for HSDPA.

Increasing the HS-DPCCH channel power in all or selected cells (by, for example, increasing the HS-DPCCH channel power offset, i.e. the beta factor, when IC is applied) is very expensive in terms of overall cell capacity, since the increased power needs to be applied even if there are no users to be cancelled. Furthermore, there may be cells where IC is not applied at all, and in these cells increasing the HS-DPCCH channel power is also unnecessary. Implementing a solution where the HS-DPCCH channel power is dependent upon whether or not there are users in the cell to be cancelled, and/or upon whether or not IC is applied, and at the same time allowing for user mobility, would probably be too complex in practice. In addition, the link quality of the HS-DPCCH channel would differ from the link quality of the other physical channels detected posterior to IC. This would make link control (e.g. transmit power control (TPC)) more difficult since the link control implicitly assumed in WCDMA relies upon the fact that the relative performance of all physical channels from a particular UE is constant. As a consequence, a lower signal quality for the HS-DPCCH channel will result in worse performance on the downlink for HSDPA.

SUMMARY

According to a first aspect of the present invention there is provided a radio base station for use in a Wideband Code Division Multiple Access network. The radio base station comprises a receiver for receiving radio signals transmitted over the air by users, and a first processor for processing the received signals in order to recover signals for a first group of users, the "cancellers", and a first set of control signals for a second group of users, the "cancellees". The radio base station further comprises an interference canceller for performing interference cancellation on the received signals using the recovered signals in order to generate an interference cancelled signal, a second processor for subsequently processing the interference cancelled signal in order to recover a second set of control signals for the cancellees, and a controller for using the control signals to control the transmission of data towards said cancellees.

At least certain embodiments of the present invention allow interference cancellation to be introduced for uplink channels, whilst not significantly impacting the performance of the link.

The control signals may be associated with High Speed-Physical Downlink Shared Channels (HS-PDSCHs) used by the cancellees, the control signals being transmitted from said cancellees to the radio base station within respective High Speed Dedicated Physical Control Channels, HS-DPCCHs. In this case, said first set of control signals may be ACK and NACK messages associated with a Hybrid Automatic Repeat Request, HARQ, method employed by the radio base station. The second set of control signals may be Channel Quality Indicator, CQI, messages.

Considering further the interference canceller, this may comprise a signal re-generator for reconstructing an interference signal using the signals recovered by said first processor, and a cancelling unit for cancelling the reconstructed interference signal from the received signals to generate said interference cancelled signal.

The radio base station may comprise a controller for sending to said cancellees, signals to increase the Beta-factor for sending said first set of control signals relative to the Beta-factor used for sending said second set of control signals.

According to a second aspect of the present invention there is provided a method of recovering control signals at a radio base station of a Wideband Code Division Multiple Access network, where the control signals are used by the radio base station to control the transmission of data to certain users. The method comprises receiving radio signals transmitted over the air by users, and processing the received signals in order to recover signals for a first group of users, the "cancellers", and a first set of control signals for a second group of users, the "cancellees. The method further comprises subsequently processing the interference cancelled signal in order to recover a second set of control signals for the cancellees, and using the control signals to control the transmission of data towards said cancellees.

Further, optional features of the method are set out in the accompanying dependent claims.

DETAILED DESCRIPTION

Figure 1:
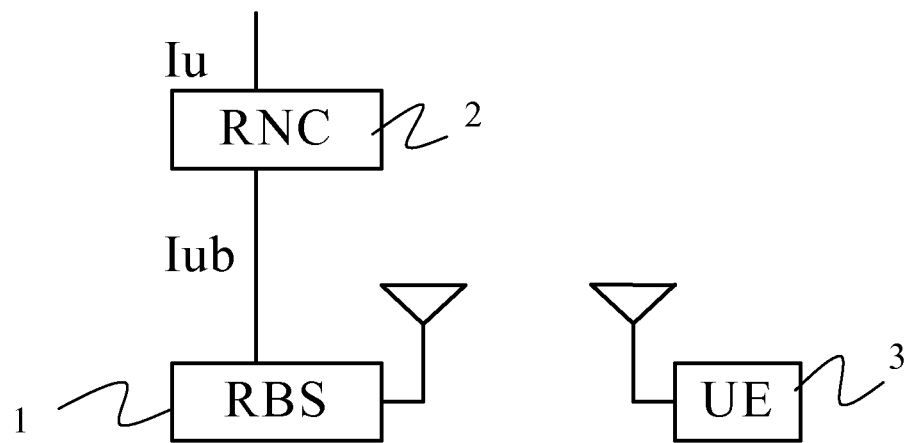
FIG. 1 illustrates schematically components of a WCDMA network.
Figure 2:
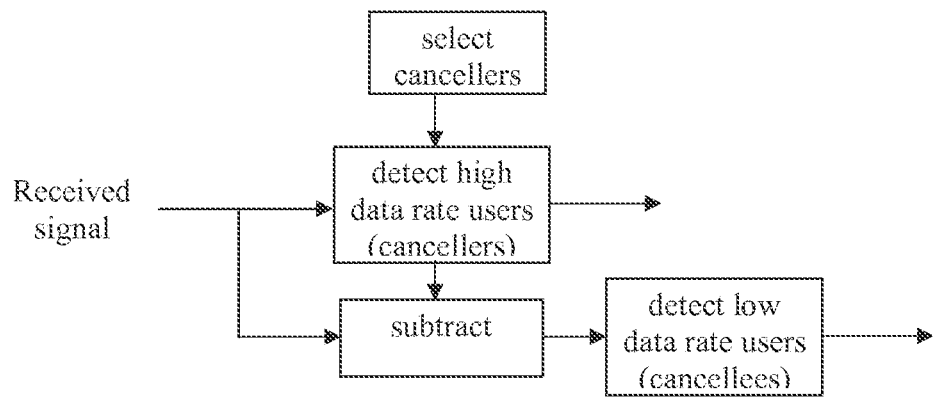
FIG. 2 illustrates schematically an Interference Cancellation process carried out at the RBS of FIG. 1.
Figure 3:
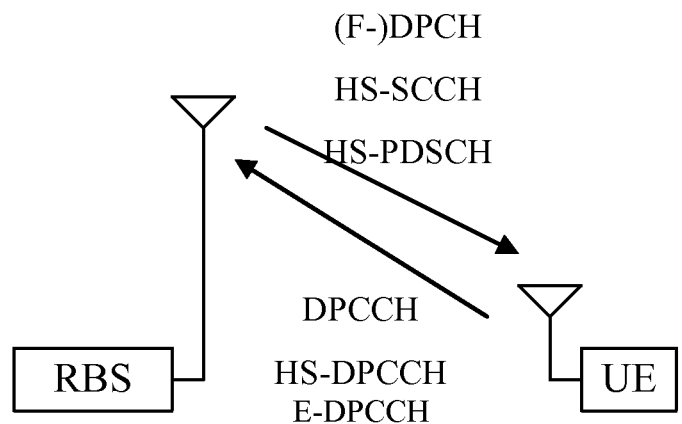
FIG. 3 illustrates uplink and downlink channels associated with HSDPA access in the network of FIG. 1.

As has already been discussed above, 3G WCDMA networks are able to make use of High Speed Downlink Packet Access (HSDPA) in order to provide users with high downlink data rates. As illustrated in FIG. 3, HSDPA employs an uplink control channel known as the High Speed-Dedicated Physical Control Channel (HS-DPCCH) in order to control the physical downlink channel. In order to allow the Radio Base Station (RBS—alternatively referred to in UMTS terminology as the Node B) to employ Interference Cancellation (IC) when detecting the HS-DPCCH for a given user (a "cancellee"), it is proposed to detect the HSDPA HARQ ACK/NACK part of the HS-DPCCH prior to IC to avoid the need for extra HARQ processes and/or lowered HSDPA DL throughput. In order to compensate for the reduced performance of the ACK/NACK detection, the relative power of the ACK/NACK bits transmitted by the User Equipment (UE) is increased. The HSDPA Channel Quality Indicator (CQI) part of the HS-DPCCH for the cancellee is detected after IC in order to minimize the UE transmitted power and to minimize the cell load caused by the CQI part.

Signalling in the WCDMA uplink (see FIG. 3) involves several physical channels including DPCCH, E-DPCCH and HS-DPCCH channels. HS-DPCCH carries layer 1 control signalling needed for the HSDPA protocol in the downlink. In particular, the HS-DPCCH channel carries:

Signalling for the HSDPA HARQ protocol, namely ACK (acknowledgement)/NACK(negative acknowledgement) messages.

Signalling for the HSDPA scheduler, namely CQI messages

When IC is introduced in the uplink receiver chain in the RBS an extra delay will be introduced for the cancellees, i.e. those users whose transmitted signals are detected after IC. The delay varies depending on whether pre- or post-decoding IC is applied.

The HARQ procedure is very latency sensitive. A longer delay in handling the ACK/NACK messages at the RBS will require more HARQ processes (and associated buffers) in the UE (and RBS). In order to keep the complexity and cost down (for UEs) there are restrictions on the number HARQ processes available in the UE. The absolute maximum number of processes that the 3GPP standard allows for is eight, although most UE implementations are optimized for fewer processes (typically six). The problems that this causes have been discussed above.

In order to eliminate or at least reduce the impact of IC on the HSDPA downlink throughput, it is desirable to detect the HARQ ACK/NACK prior to IC for the cancellees. A potential drawback of this approach is that, in the absence of any further counter-measures, the signal quality with which the ACK/NACK messages are detected will be worse compared to the case where no IC is used (the ACK/NACK messages are associated with the cancellees, i.e. signals detected after cancellation, such that feedback provided to the UEs in respect of the cancellees may result in the UE transmitting with a reduced power—the ACK/NACK messages will be transmitted with this reduced power but will not benefit from IC). However, it is possible to compensate for this by selectively increasing the power with which the UE transmits the ACK/NACK messages, i.e. by increasing the $\Delta_{ACK}$ and $\Delta_{NACK}$ (3GPP 25.213 Section 4.2.1.2) for ACK/NACK messages of the HS-DPCCH. This should have a very limited impact on the total cell capacity as the ACK/NACK part only occupies only around one third (⅓) of the HS-DPCCH frame and as ACK/NACK messages are not transmitted simultaneously by all users (UEs). The number of UEs per cell that can simultaneously transmit ACK/NACK in the uplink in one cell is limited due to the fact that HS-DSCH code multiplexing allows only for a limited number of UEs to be scheduled simultaneously in the downlink.

In contrast, for the CQI part of the DPCCH, the signalling is not as delay sensitive. Moreover, it is not desirable to increase the transmitted power for the CQI part as it occupies two thirds (⅔) of the HS-DPCCH frame and is transmitted from all active (in CELL_DCH state) HSDPA UEs in any given cell, possibly as often as every Transmission Time Interval (TTI). It is therefore proposed to detect the CQI part after IC for the cancellees. The IC gain is then fully utilized for the CQI part, i.e. the transmitted power from the UE is minimized as is the cell load. As the CQI part of the HS-DPCCH channel is detected posterior to IC, the relative performance of this part compared to other physical channels detected posterior to IC will remain constant. This in turn makes it easier to manage the link control. Even though the ACK/NACK part of the HS-DPCCH channel is detected prior to IC and the CQI part posterior to IC, the impact on the complexity of the receiver in the RBS is limited since only the relevant parts of the HS-DPCCH (i.e. ACK/NACK or CQI) have to be despread and detected prior to (or posterior to) IC. Hence, the total complexity increase is limited.

Figure 4:
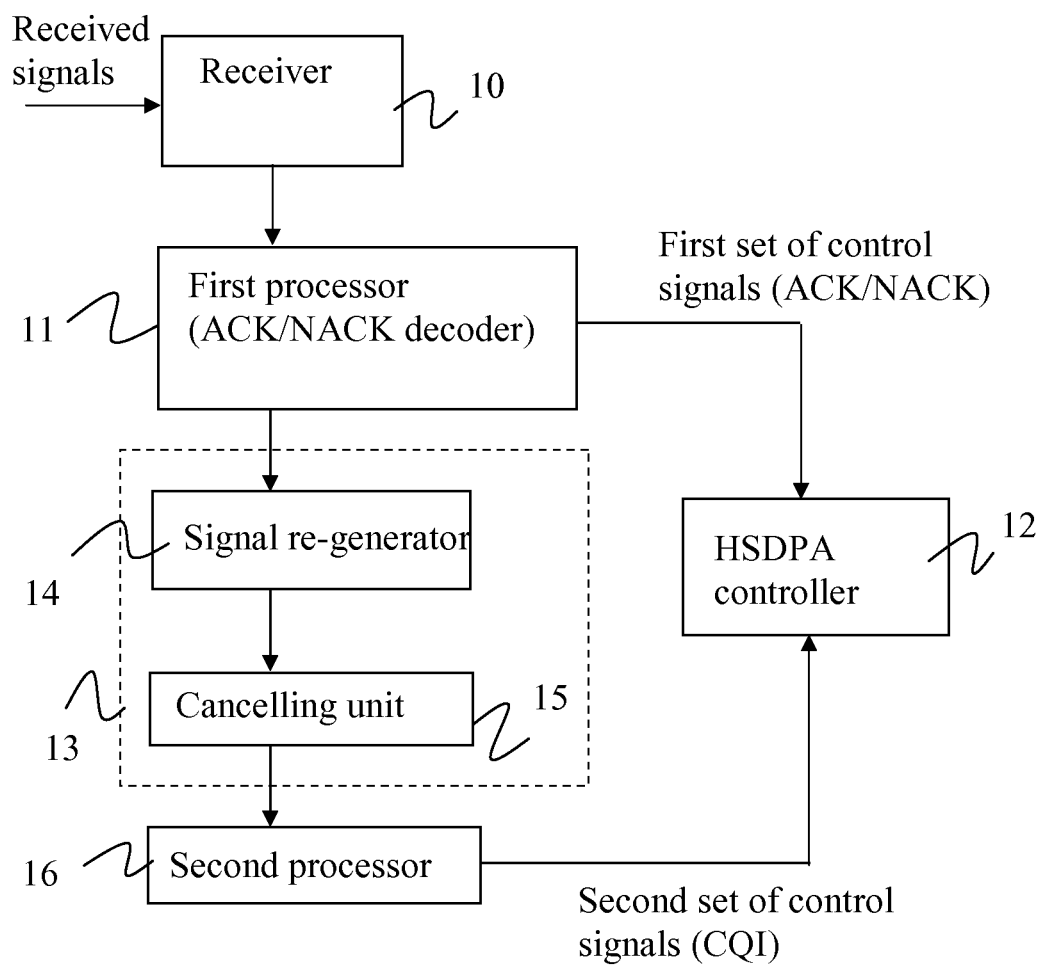
FIG. 4 illustrates schematically a Radio Base Station architecture implementing an Interference Cancellation process.

FIG. 4 illustrates schematically various components of a Radio Base Station configured to implement the IC procedure discussed above. The RBS comprises a receiver 10 for receiving signals received over the air interface. The signals are passed to a first processor 11 configured to recover the ACK/NACK message parts of the HS-DPCCH channels for the cancellees. The processor will also of course recover data for the designated cancellers. The recovered ACK/NACK messages are passed to an HSDPA controller 12 which maintains the ongoing HARQ processes (the data recovered for the cancellers is processed in the normal way and is not illustrated further in the Figure). An Interference Canceller (IC) unit 13 receives both the original received signal and the recovered data (i.e. the ACK/NACK messages for the cancellees and all data for the cancellers). A signal re-generator 14 regenerates the interference part of the HS-DPCCH channel from the received data, and a cancelling unit 15 subtracts this from the received signal. The result is passed to a second processor 16 which recovers the CQI message parts from the interference cancelled signal for the cancellees. This message part is passed to the HSDPA controller 12, which uses the data to manage the DL scheduling for the cancellees. It will be appreciated that the HSDPA controller 12 also receives ACK/NACK messages and CQI signals for the cancellers from the first processor 11.

Figure 5:
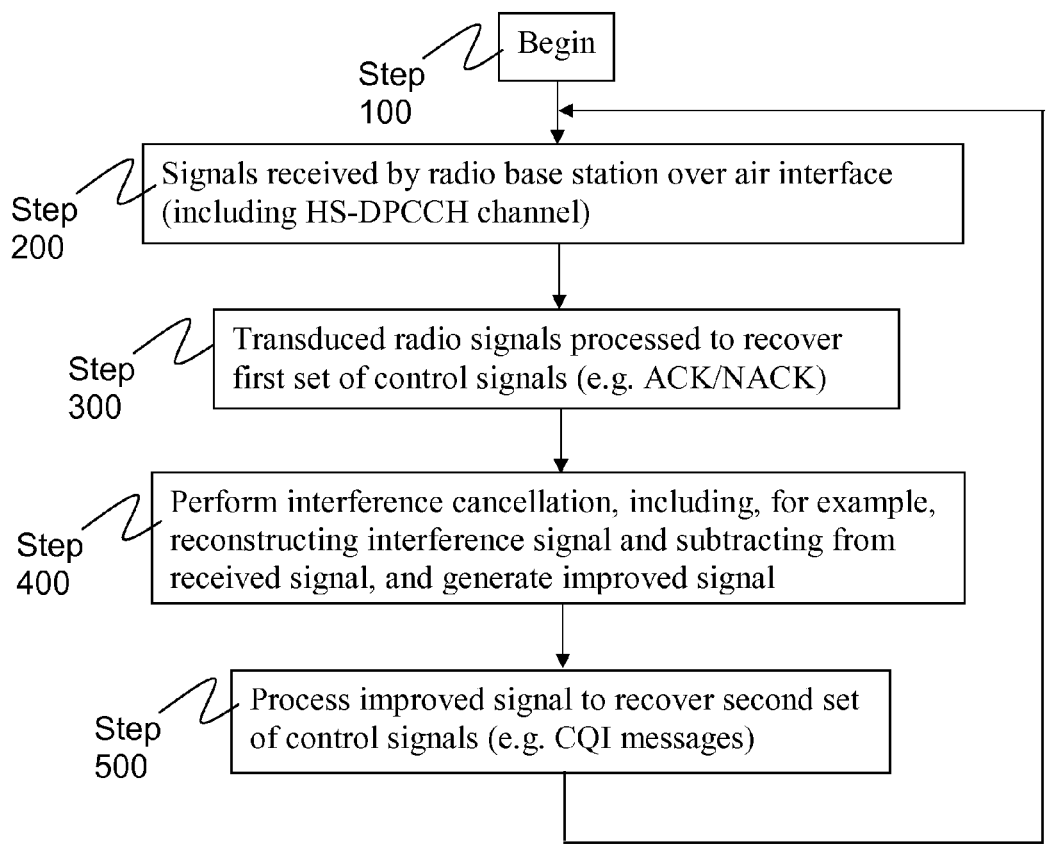
FIG. 5 is a flow diagram illustrating an Interference Cancellation process in the Radio Base Station of FIG. 4.

FIG. 5 is a flow diagram illustrating in general terms the IC process described above.

The process begins at step 100. At step 200, the radio signals received by the RBS are handled to provide a corresponding electrical signal containing the HS-DPCCH channels for both the cancellers and the cancellees. At step 300, the signal is processed using appropriate decoding techniques to recover the ACK/NACK message parts for the cancellees (as well as to recover all data for the cancellers). Then, at step 400, interference cancellation is performed by reconstructing the interference signal from the ACK/NACK message parts and the data recovered for the cancellers, and by subtracting that signal from the received signal. Finally, at step 500, the improved signal is processed to recover the CQI message part for the cancellees.

Certain of the abbreviations used above are set out in the following list.
ACK Acknowledge
CQI Channel Quality Indicator
DL DownLink
FDD Frequency Division Duplex
HS-DPCCH High Speed-Dedicated Physical Control Channel
HSDPA High Speed Downlink Packet Access
HARQ Hybrid-ARQ (Automatic Repeat Re Quest)
NACK Negative Acknowledge
RBS Radio Base Station
SINR Signal to Interference plus Noise Ratio
UE User Equipment
UL UpLink It will be appreciated by the person of skill in the art that various modifications may be made to the above described embodiments without departing from the scope of the invention. For example, whilst the above discussion has been concerned with splitting the handling of the ACK/NACK and CQI message parts for the cancellees, such that the former is performed prior to IC whilst the latter is performed after IC, it will be appreciated that the general principles can be applied to the handling of any WCDMA network control channel message parts, where one part is highly delay sensitive and another part is not. For example DL TPC bits, TFCI bits and FBI bits of DPCCH, (3GPP 25.211 5.2.1.1), and RSN, E-TFCI and "happy" bit of E-DPCCH (3GPP 25.212 4.9).

The invention claimed is:

1. A radio base station for use in a Wideband Code Division Multiple Access network, the radio base station comprising:
   a receiver for receiving radio signals transmitted over the air by users;
   a first processor for processing the received signals in order to recover signals for a first group of users, the "cancellers", and a first set of control signals for a second group of users, the "cancellees";
   an interference canceller for performing interference cancellation on the received signals using the recovered signals in order to generate an interference cancelled signal;
   a second processor for subsequently processing the interference cancelled signal in order to recover a second set of control signals for the cancellees; and
   a controller for using the control signals to control the transmission of data towards said cancellees.

2. A radio base station according to claim 1, wherein said control signals are associated with High Speed-Physical Downlink Shared Channels (HS-PDSCHs) used by the cancellees, the control signals being transmitted from said cancellees to the radio base station within respective High Speed Dedicated Physical Control Channels, HS-DPCCHs.

3. A radio base station according to claim 2, wherein said first set of control signals are ACK and NACK messages associated with a Hybrid Automatic Repeat Request, HARQ, method employed by the radio base station.

4. A radio base station according to claim 2, wherein said second set of control signals are Channel Quality Indicator, CQI, messages.

5. A radio base station according to claim 1, wherein said interference canceller comprises:
   a signal re-generator for reconstructing an interference signal using the signals recovered by said first processor; and
   a cancelling unit for cancelling the reconstructed interference signal from the received signals to generate said interference cancelled signal.

6. A radio base station according to claim 1 and comprising a controller for sending to said cancellees, signals to increase the Beta-factor for sending said first set of control signals relative to the Beta- factor used for sending said second set of control signals.

7. A method of recovering control signals at a radio base station of a Wideband Code Division Multiple Access network, where the control signals are used by the radio base station to control the transmission of data to certain users, the method comprising:
    receiving radio signals transmitted over the air by users;
    processing the received signals in order to recover signals for a first group of users, the "cancellers", and a first set of control signals for a second group of users, the "cancellees";
    subsequently processing the interference cancelled signal in order to recover a second set of control signals for the cancellees; and
    using the control signals to control the transmission of data towards said cancellees.

8. A method according to claim 7, wherein said first and second sets of control signals are associated with a High Speed-Physical Downlink Shared Channel (HS-PDSCH) used by the cancellees, the control signals being transmitted from said cancellees to the radio base station within respective High Speed Dedicated Physical Control Channels, HS-DPCCHs.

9. A method according to claim 8, wherein said first set of control signals are ACK and NACK messages associated with a Hybrid Automatic Repeat Request, ARQ, method employed by the radio base station.

10. A method according to claim 8, wherein said second set of control signals are Channel Quality Indicator, CQI, messages.

11. A method according to claim 7, wherein said step of performing interference cancellation comprises:
    reconstructing an interference signal using the signals recovered by said first processor; and
    cancelling the reconstructed interference signal from the received signals to generate said interference cancelled signal.

12. A method according to claim 7 and comprising sending to said cancellees, signals to increase the Beta-factor for sending said first set of control signals relative to the Beta-factor used for sending said second set of control signals.

* * * * *